United States Patent [19]

Oyanagi et al.

[11] Patent Number: 4,815,005
[45] Date of Patent: Mar. 21, 1989

[54] SEMANTIC NETWORK MACHINE FOR ARTIFICIAL INTELLIGENCE COMPUTER

[75] Inventors: Shigeru Oyanagi; Sumikazu Fujita, both of Yokohama; Sadao Nakamura, Yamato, all of Japan

[73] Assignee: Kabushiki Kaisha Toshiba, Kawasaki, Japan

[21] Appl. No.: 122,446

[22] Filed: Nov. 19, 1987

[30] Foreign Application Priority Data

Nov. 29, 1986 [JP] Japan .................. 61-284549

[51] Int. Cl.⁴ .......................................... G06F 15/18
[52] U.S. Cl. .................................. 364/513; 364/300
[58] Field of Search ............................. 364/513, 300

[56] References Cited

U.S. PATENT DOCUMENTS

| | | | |
|---|---|---|---|
| 4,651,284 | 3/1987 | Watanbe et al. | 364/491 |
| 4,670,848 | 6/1987 | Schramm | 364/513 |
| 4,675,829 | 6/1987 | Clemenson | 364/513 |
| 4,730,259 | 3/1988 | Gallant | 364/513 |
| 4,734,856 | 3/1988 | Davis | 364/513 X |

OTHER PUBLICATIONS

Technical Report of IECES. EC85-55; T. Higuchi, T. Furuya et al.; "A Semantic Network Machine with Associative Memories".

*Primary Examiner*—A. D. Pellinen
*Assistant Examiner*—H. L. Williams
*Attorney, Agent, or Firm*—Oblon, Fisher, Spivak, McClelland & Maier

[57] ABSTRACT

A semantic network machine is applied to an artificial intelligence computer for performing inferential retrieval with respect to a knowledge base. A main associative memory stores the knowledge base consisting of knowledge data arranged to form a semantic network. Each knowledge data consists of a set of an object, an attribute, and a value. A sub associative memory is connected in parallel with the main memory and stores specific knowledge data including "is-a" attributes of the knowledge data. In an inferential retrieval mode, when a question associated with a given object is input, an initial retrieval condition for retrieving, from the knowledge base, knowledge data necessary for answering the question is defined. While the main memory is accessed using the initial retrieval condition, the sub memory is also accessed simultaneously to read out data representing another object concept associated with the object concept included in the question by the "is-a" attribute from the sub memory in a parallel manner. The readout data is temporarily stored in a buffer memory. When retrieval in the main memory fails, the initial retrieval condition is updated using the data stored in the buffer memory to generate a secondary initial retrieval condition supplied to the main memory, which is then successively accessed using the updated condition.

11 Claims, 3 Drawing Sheets

| BIRD | has | WING |
|------|------|------|
| ROBIN | is-a | BIRD |
| CLYDE | is-a | ROBIN |
| CLYDE | owns | NEST 1 |
| NEST 1 | is-a | NEST |

| ROBIN | BIRD |
|-------|------|
| CLYDE | ROBIN |
| NEST 1 | NEST |

SEMANTIC NETWORK MACHINE FOR ARTIFICIAL INTELLIGENCE COMPUTER

BACKGROUND OF THE INVENTION

The present invention relates to a semantic network machine used in an artificial intelligence computer system and, more particularly, to an apparatus and method which can perform inferential retrieval processing of a knowledge base consisting of a plurality of knowledge data arranged to constitute a semantic network, and can automatically solve high-level problems.

The existing von Neumann computer system is electronic equipment which carries out desired computing processing at high speed in accordance with a predetermined algorithm as software. The computer system is very popular for executing routine business tasks or for managing a data base so as to assist working capacity of man. However, the computer system has the limitation in that it cannot replace the intellectual faculty of man. In order to provide a breakthrough to this problem, studies have been made to provide an intellect to a computer so that it automatically provides solutions to high-level problems equivalent to those given by intellectual activities of man. An approach for technically realizing the subject of studies is generally called "artificial intelligence".

The basic functions of an artificial intelligence computer system, which is expected as a new generation computer, mainly include (1) inference function, (2) knowledge base function, (3) intellectual interface function, (4) intellectual programming function, and the like. The knowledge base function can be defined as a function not for simply accumulating data but for systematically storing and retrieving knowledge systematizing logical decisions, experiences, learning results, and the like. As a technique for representing knowledge using a computer, a semantic network is known. According to the semantic network, the conceptional structure of knowledge is represented by objects and their mutual relationships. In the semantic network, the objects are normally indicated by nodes. The nodes are coupled by links such as arrows, so that the mutual relationships therebetween are represented in a network manner. In the semantic network, inference is performed by following events along the links. A knowledge base which is constituted on the basis of the semantic network is featured in that (i) since information associated with a given object can be easily extracted, associative inference processing can be performed, (ii) a concept is systematized to minimize the volume of information to be stored, and (iii) a storage method resembling the human brain can be realized.

According to Technical Report of IECEJ, EC85-55, "A Semantic Network Machine with Associative Memories", T. Higuchi et al., (1986), pages 9-20, a knowledge base which is constituted based on a semantic network is stored in a main associative memory. Objects are mutually connected by links to form a pyramid-shaped tree structure. In a unit knowledge, e.g., knowledge "ROBIN has WING", "ROBIN" is called an object, "has" is called an attribute, and "WING" is called a value. According to the semantic network, object "ROBIN" and value "WING" are represented by nodes, and attribute "has" is represented by a link. A set of "object-attribute-value" is stored in an associative memory as unit knowledge data. Other knowledges are similarly stored in the associative memory, thus forming a knowledge list in the associative memory.

With this arrangement, assuming that a question "What does CLYDE have?" is input and the question is answered, if only knowledge data teaching "BIRD has WING" is prepared in the associative memory, the following inferential retrieval must be sequentially performed for the associative memory:

(1) retrieval of knowledge data "CLYDE has *" (first cycle, this retrieval is unsuccessful);

(2) retrieval for finding what is "CLYDE" (second cycle);

(3) retrieval of knowledge data "ROBIN has *" after knowledge teaching that "CLYDE" is "ROBIN" is retrieved (third cycle, this retrieval is unsuccessful);

(4) retrieval for finding what is "ROBIN" (fourth cycle);

(5) retrieval of knowledge data "BIRD has *" after knowledge teaching "ROBIN" is "BIRD" is retrieved (fifth cycle, knowledge "ROBIN has WING" is found and the retrieval is successful); and (6) outputting answer ["CLYDE" has "WING"] to the question.

Although parallel data access is performed in the associative memory, the above retrieval cycles must be sequentially executed upon execution of inferential retrieval processing (matching processing) for extracting knowledge necessary for answering a given question. This results in an increase in the processing time and a decrease in the execution speed of the inference processing. Even the above simple example requires at least five retrieval cycles. As the knowledge base becomes more complicated, the number of retrieval cycles is increased. As a result, the inference processing speed is further decreased.

SUMMARY OF THE INVENTION

It is therefore an object of the present invention to provide a new and improved semantic network system which can perform high-speed inferential retrieval processing of an artificial intelligence knowledge base system.

In accordance with the above object, the present invention is addressed to a specific semantic network machine which has a main associative memory unit for storing a plurality of knowledge data arranged to form a semantic network, thereby constituting a knowledge base. Each knowledge data consists of a set of an object, an attribute, and a value. A sub associative memory unit is arranged in parallel with the main associative memory unit, and stores a plurality of specific knowledge data including "is-a" attributes of the knowledge data. A retrieval control unit is connected to the main and sub associative memory units. While the retrieval control unit accesses the main associative memory unit so as to retrieve knowledge data necessary for answering an input question in an inferential retrieval mode, it also accesses the sub associative memory unit in a parallel manner or at the same time. When data accessing of the main associative memory unit is unsuccessful, the access result in the sub associative memory unit is fed back to the main associative memory unit, and the main associative memory unit is successively accessed using the access result as a part of a new retrieval condition. Thus, an object concept included in the question and another object concept associated by the "is-a" attribute are read out from the sub associative memory unit in a parallel manner and constitute an updated retrieval condition of the main associative memory unit, based on which the retrieval operation of the main associative memory unit is continued.

The invention, its objects and advantages will become more apparent from the detailed description of a preferred embodiment presented below.

BRIEF DESCRIPTION OF THE DRAWINGS

In the detailed description of a preferred embodiment of the invention presented below, reference is made to the accompanying drawings of which.

DETAILED DESCRIPTION OF THE PREFERRED EMBODIMENT

Figure 1:
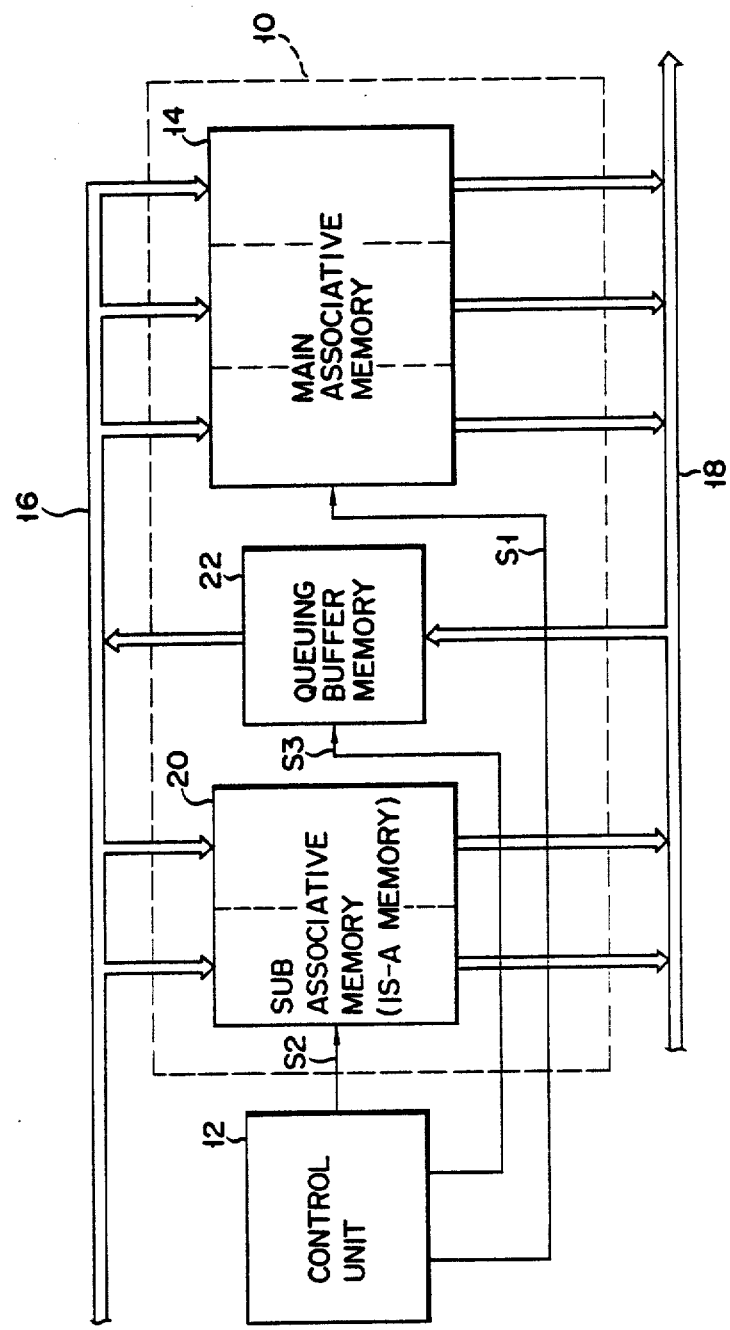
FIG. 1 is a diagram showing a circuit arrangement of a semantic network machine constituting a principal part of a knowledge base system of an artificial intelligence computer as a preferred embodiment of the present invention.

Referring to FIG. 1, knowledge base unit 10 and control unit 12 serving as an inference engine constitute a core structure of a knowledge base system of an artificial intelligence computer. Knowledge base unit 10 is connected to a known knowledge acquisition unit (not shown) which stores a plurality of knowledge data acquired by a conventional method (the basic method is disclosed in "The Handbook of Artificial Intelligence" co-written by A. Barr and E. A. Feigenbaum, Vol. 1, pages 180-189). In this sense, the circuit arrangement shown in FIG. 1 is called a "semantic network machine".

Knowledge base unit 10 includes main associative memory 14. Associative memory 14 is connected between internal data bus lines, i.e., input data bus line 16 and output data bus line 18. Control unit 12 is connected to associative memory 14 through control line S1. Acquired knowledge data are stored in associative memory 14 to constitute a semantic network as shown in FIG. 2.

Figures 2, 3, 4:
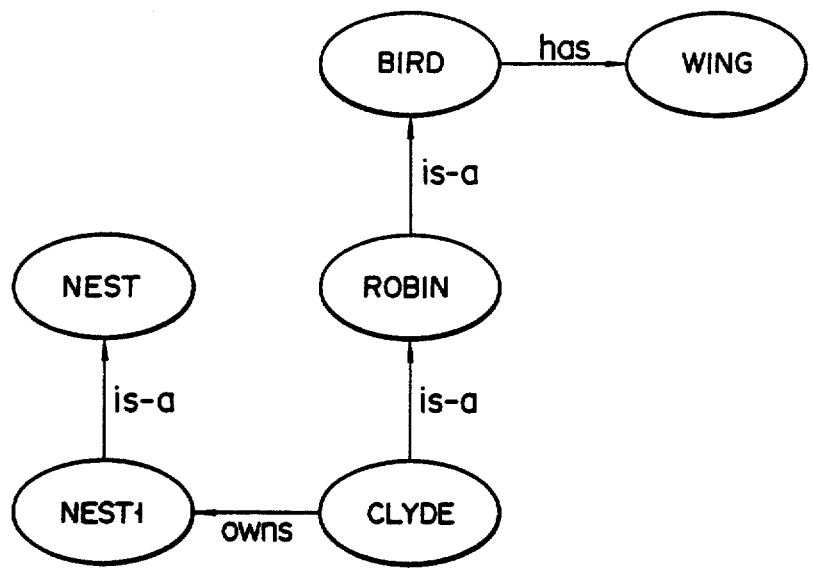
FIG. 2 is a diagram showing an example of a simplified semantic network based on which the knowledge base system is constituted.
FIGS. 3 and 4 are diagrams illustrating memory maps showing knowledge data storage contents of main and sub associative memories arranged in the knowledge base unit of the semantic network machine shown in FIG. 1.

The semantic network shown in FIG. 2 (labels are also added to links drawn as arrows following the general practice in this art) is constituted to represent the following knowledges:

| "BIRD has WING" | (A) |
| "ROBIN is-a BIRD" | (B) |
| "CLYDE is-a ROBIN" | (C) |
| "CLYDE owns NEXT1" | (D) |
| "NEST1 is-a NEXT" | (E) |

In these unit knowledge data A to E, a portion corresponding to a subject of a sentence (e.g., "BIRD" in knowledge A) is called an "object". A portion corresponding to a verb of a sentence (e.g., "has" in knowledge A) is called an "attribute". A portion corresponding to an object of a sentence (e.g., "WING" in knowledge A) is called a "value". The semantic network is defined as sets of "object-attribute-value" corresponding to respective knowledge data.

More specifically, objects and values are represented by nodes in the semantic network in FIG. 2, and attributes, i.e., the mutual relationships between nodes are represented by links drawn as arrows. The links include a "has" link, an "is-a" link, and an "owns" link. (In this case, the "is-a" link is an attribute indicating a hierarchical relationship between objects or values.) In nodes connected by the "is-a" link, the attribute of a high-order concept is inherited by a low-order concept. For example, the nature of object "CLYDE" is inherited from objects "ROBIN" and "BIRD" by the "is-a" links represented by vertical arrows drawn at the center of the semantic network shown in FIG. 2. Therefore, in the inferential retrieval mode by control unit 12, by following the "is-a" links, even if the knowledges presented below are not directly stored in associative memory 14, they can be inferred based on the knowledge base in the form of the semantic network:

| "ROBIN has WING" | (x) |
| "CLYDE has WING" | (y) |
| "CLYDE is-a BIRD" | (z) |

FIG. 3 illustrates the memory map of knowledge data represented by the semantic network of FIG. 2 in associative memory 14.

Referring again to FIG. 1, knowledge base unit 10 further includes sub associative memory 20. Sub associative memory 20 is connected in parallel with main associative memory 14 between input and output data bus lines 16 and 18. Control unit 12 is connected to memory 20 through control line S2. Sub associative memory 20 only stores knowledge data including "is-a" attributes of the knowledge base in the form of the semantic network stored in memory 14. Therefore, in the case of the semantic network shown in FIG. 2, only knowledge data B, C, and E are also stored in associative memory 20. In other words, knowledge data having "is-a" attributes are stored not only in main associative memory 14 together with other knowledge data but also solely in sub associative memory 20. FIG. 4 illustrates the memory map of these knowledge data in memory 20. Therefore, associative memory 20 may be called an "is-a memory". Knowledge data accessing in memories 14 and 20, i.e., processing for inferential retrieval can be performed at the same time (independently) under the control of control unit 12.

Knowledge base unit 10 further includes queuing buffer memory 22 to which control unit 12 is connected by control line S3. Buffer memory 22 is arranged between input and output data bus lines 16 and 18 to temporarily store the retrieval results from is-a memory 20. After simultaneous accessing of memories 14 and 20, the retrieval result output from is-a memory 20 is supplied to queuing buffer memory 22 through output data bus 18 and is stored therein. The storage data of buffer memory 22 is fed back to main associative memory 14 through input data bus line 16 under the timing control of control unit 12.

Figure 5A:
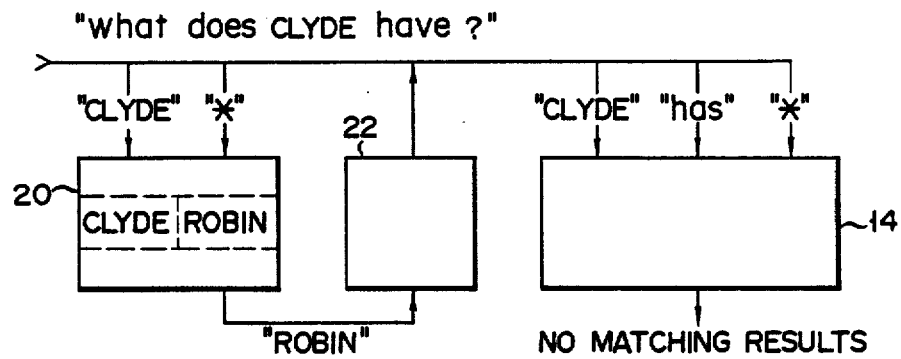
FIGS. 5A to 5C are block diagrams illustrating knowledge data storage states of the main and sub associative memories in principal steps of an inferential retrieval mode performed in the semantic network machine shown in FIG. 1.

The operation mode of the semantic network machine of the knowledge base system with the above arrangement will now be described with reference to FIGS. 5A to 5C.

In the semantic network machine, when question "Does CLYDE own NEST1?" is input through input data bus line 16, control unit 12 accesses associative memory 14 to start retrieval of knowledge data defining the relationship between object "CLYDE" and value "NEST1". In this case, since the content of associative memory 14 includes "CLYDE owns NEST1" as a set of "object-attribute-value", this set is extracted, and is output through output data bus line 18. Therefore, retrieval of associative memory 14 necessary for answering the question is completed in one cycle.

In the semantic network machine, when question "What does CLYDE own?" is input through input data bus line 16, control unit 12 accesses associative memory 14 to retrieve knowledge data including object "CLYDE" and attribute "owns". In other words, unit 12 retrieves "CLYDE owns *" as set data "object-attribute-value" from the data list of associative memory 14. Note that symbol "*" is a convenient symbol used for representing an arbitrary word. Upon execution of this retrieval, knowledge data "CLYDE owns NEST1" is found from the data list of associative memory 14. The knowledge data is output as the answer to the above question through output data bus line 18. Therefore, in this case, again, the retrieval of associative memory 14 can be completed in one cycle.

In the semantic network machine, when question "What does CLYDE have?" is input through input data bus line 16, control unit 12 accesses main associative memory 14 to retrieve knowledge data including object "CLYDE" and attribute "has". However, this retrieval is unsuccessful. This is because no set data "object-attribute-value" of "CLYDE has *" is prepared in the data list of associative memory 14. Therefore, in this case, optimal knowledge data cannot be retrieved in only one cycle unlike the above-mentioned cases. In this case, high-speed optimal inferential retrieval can be performed by parallel accessing of main and sub associative memories 14 and 20 as follows.

First Cycle

When question "What does CLYDE have?" is input, according to this embodiment, matching processing for retrieving knowledge data having object "CLYDE" (represented by "CLYDE *") from knowledge data having is-a attributes stored in sub associative memory 20 is executed parallel to the execution of matching processing for retrieving knowledge data "CLYDE has *" from main associative memory 14. As a result, no matching results are obtained from associative memory 14, while knowledge data "CLYDE is-a ROBIN" is found in associative memory 20. Based on the retrieved knowledge data, data "ROBIN" is read out through output data bus line 18 as the retrieval result (matching result) of sub associative memory 20. FIG. 5A illustrates the retrieval state in this case. It is found from retrieval of associative memory 20 that object "CLYDE" included in the input question has the high-order concept "ROBIN". The relationship between these words is also supported by attribute links in the semantic network shown in FIG. 2.

Second Cycle

Figure 5B:
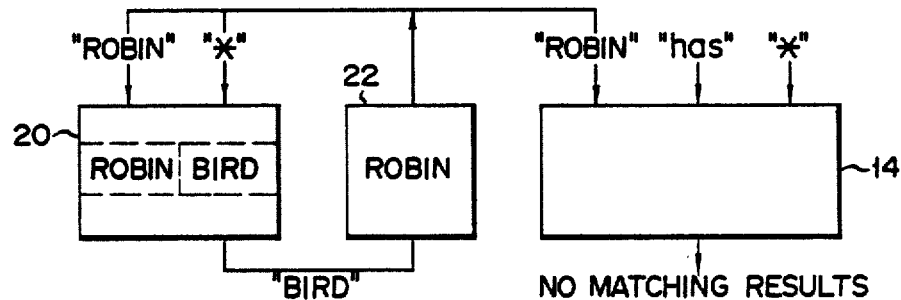
Figure 5C:
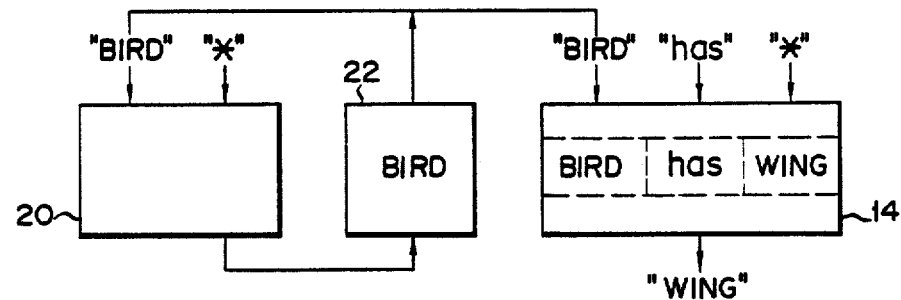

The retrieval result of sub associative memory 20, i.e., data "ROBIN", is stored in buffer memory 22, as shown in FIG. 5B. (If a plurality of "is-a" attribute links are present for a single object concept, a plurality of data may be read out from associative memory 20, and may be stored in buffer memory 22.) The storage data of buffer memory 22 is fed back to associative memory 14 through input data bus line 16 under the timing control of control unit 12. Control unit 12 updates retrieval condition "CLYDE has *" for associative memory 14 to "ROBIN has *". Updating from "CLYDE" to "ROBIN" can be performed since the attribute therebetween is "is-a" attribute. As described above, in objects associated with the "is-a" attribute, the nature of one object is inherited to the other object. Therefore, when the retrieval of associative memory 14 necessary for answering the input question is performed, a word in the retrieval condition sentence can be replaced with another word connected thereto by the "is-a" attribute. Control unit 12 again starts retrieval of main associative memory 14 using updated new retrieval condition "ROBIN has *". In this case, however, no data matching with "ROBIN has *" is prepared in the storage content of associative memory 14 (the list of knowledge data). Therefore, this retrieval also fails.

A careful attention should be paid to the fact that storage data "ROBIN" in buffer memory 22 is fed back not only to associative memory 14 but also to sub associative memory 20 at the same time in the second cycle. More specifically, storage data "ROBIN" in buffer memory 22 is transferred to main associative memory 14, and is replaced with word "CLYDE" in the initial retrieval condition sentence. Meanwhile, data "ROBIN" is transferred to sub associative memory 14 to be replaced with word "CLYDE" in the initial retrieval condition sentence "CLYDE *" for memory 14. Therefore, the matching processing with secondary retrieval condition sentence "ROBIN has *" is performed in associative memory 14, while retrieval matching processing for determining whether or not another concept having concept "ROBIN" and the "is-a" attribute is present in sub associative memory 20 is performed at the same time. As a result, no matching results are obtained from associative memory 14. However, high-order concept word "BIRD" is retrieved and extracted from sub associative memory 20 since the storage content of memory 20 includes knowledge data "ROBIN is-a BIRD" (see FIG. 4).

Third Cycle

Concept word "BIRD" retrieved from associative memory 20 is transferred to buffer memory 22, and is stored therein in place of prestored word data "ROBIN", as shown in FIG. 5B. Storage data "BIRD" in buffer memory 22 is fed back to associative memory 14 under the timing control of control unit 12. Control unit 12 updates secondary retrieval condition "ROBIN has *" of main associative memory 14 to tertiary retrieval condition "BIRD has *". Updating from "ROBIN" to "BIRD" can be performed since the attribute therebetween is "is-a" attribute in the same manner as described above. Control unit 12 again starts retrieval of associative memory 14 using updated new retrieval condition "BIRD has *". In this situation, since knowledge data "BIRD has "WING" matching with "BIRD has *" is prepared in the storage content (the list of knowledge data) of main associative memory 14, this retrieval is successful, and the retrieval result "WING" can be obtained from memory 14, as shown in FIG. 5C. Retrieved data "WING" is read out through output data bus line 18 as data constituting the answer to the input question. In this manner, answer "CLYDE has WING" to question "What does CLYDE have?" can be automatically obtained by inferential retrieval.

According to the embodiment of the present invention, when inferential retrieval of the knowledge base which is constituted in advance to answer an input question is performed, knowledge data having "is-a" attributes stored in sub associative memory 20 are subjected to retrieval parallel to retrieval of main associative memory 14, thereby checking if a concept word in "is-a" attribute relationship with a concept word included in the question and meaning the object is present. Since retrieval of a word corresponding to a high-order concept of the concept word in the question is performed parallel to the normal retrieval in main associative memory 14, even if primary retrieval matching processing fails in memory 14, the retrieval result (extracted another concept word) from sub associative memory 20 is fed back to the retrieval condition sentence of main associative memory 14, thereby immediately starting secondary retrieval matching processing in memory 14. No waiting time is present between primary and secondary retrieval matching processings in memory 14. This can be understood from the fact that the memory capacity of sub associative memory 20 is basically smaller than that of main associative memory 14, and hence, accessing of memory 20 is always completed before accessing of memory 14 is completed. Parallel accessing in memory 20 is repeatedly performed until retrieval matching processing in memory 14 is successful, and the retrieval condition for memory 14 is updated accordingly. Therefore, a time until the matching processing is successful in memory 14 can be shortened, and a total inferential retrieval speed of the semantic network machine can be improved.

According to the present invention, the retrieval result of memory 20 is temporarily stored in buffer memory 22, and the storage data is not only transferred to memory 14 but also fed back to memory 20, as shown in FIG. 5B. Therefore, the retrieval operation in memory 20 can be performed parallel to the secondary retrieval operation (re-retrieval operation) in memory 14. In other words, data accessing for retrieving the high-order concept of a word in question in memory 20 is always performed prior to the normal retrieval operation in memory 14 at that time, and the retrieval result is stored in buffer memory 22. Therefore, inferential retrieval cycles in memory 14 can be successively performed without idle time. This fact also greatly contributes to an improved processing speed of the semantic network machine.

According to the above embodiment, knowledge data having "is-a" attributes are stored in both main and sub associative memories 14 and 20. Therefore, the knowledge data can be independently retrieved from memories 14 and 20, as needed. This can improve memory data accessing efficiency, and hence, contributes to an improvement of an inferential retrieval processing speed.

Although the invention has been described with reference to a specific embodiment, it shall be understood by those skilled in the art that numerous modifications may be made that are within the spirit and scope of the inventive contribution.

What is claimed is:

1. A semantic network machine comprising:
   first associative memory means for storing a plurality of knowledge data arranged to form a semantic network, thereby constituting a knowledge base, each of the knowledge data having a set of an object, an attribute, and a value, and the attribute including an "is-a" attribute;
   second associative memory means, arranged in parallel with said first associative memory means, for storing a plurality of specific knowledge data including the "is-a" attributes of the plurality of knowledge data; and
   retrieval control means, connected to said first and second associative memory means, for parallel-accessing said second associative memory means while accessing said first associative memory means so as to retrieve knowledge data necessary for answering an input question in an inferential retrieval mode, for, when the accessing in said first associative memory means fails, feeding back an access result, which represents another object concept associated with an object concept included in the input question by the "is-a" attribute, from said second associative memory means to said first associative memory means, and for successively accessing said first associative memory means using the access result as a part of a new retrieval condition.

2. The machine according to claim 1, further comprising:
   buffer memory means, connected to said second associative memory means, for temporarily storing data representing the access result from said second associative memory means.

3. The machine according to claim 2, wherein said retrieval control means controls said buffer memory means to feed back the data stored therein to said first and second associative memory means, so that a retrieval condition for said second associative memory means is updated using the data.

4. The machine according to claim 3, wherein said first associative memory means comprises a main associative memory, and said second associative memory means comprises a sub associative memory.

5. A semantic network machine which is applied to an artificial intelligence computer performing inferential retrieval of a knowledge base, said machine comprising:
   main associative memory means for storing a plurality of knowledge data arranged to form a semantic network, thereby constituting a knowledge base, each of the knowledge data having a set of an object, an attribute, and a value, and the attribute including an "is-a" attribute;
   sub associative memory means, arranged in parallel with said main associative memory means, for storing a plurality of specific knowledge data including the "is-a" attributes of the plurality of knowledge data;
   buffer memory means, connected to said main and sub associative memory means, for temporarily storing data read out from said sub associative memory means; and
   retrieval control means, connected to said main and sub associative memory means, for, (i) in an inferential retrieval mode, defining, for said main associative memory means, a first initial retrieval condition necessary for retrieving, from said knowledge base, knowledge data necessary for answering an input question associated with a given object, (ii) for defining, for said sub associative memory means, a second initial retrieval condition necessary for retrieving the given object included in the question and another object having the "is-a" attribute from the storage content of said sub associative memory means, (iii) for accessing said sub associative memory means using the second initial retrieval condition simultaneously with accessing of said main associative memory means using the first initial retrieval condition so as to read out data representing another object concept associated with the object concept included in the question by the "is-a" attribute from said sub associative memory means in a parallel manner and to store the readout data in said buffer memory means, (iv) for, when the retrieval in said main associative memory means fails, updating the first initial retrieval condition using the data stored in said buffer memory means to form a secondary first retrieval condition supplied to said main associative memory means, and v) for successively accessing said main associative memory means using the secondary first retrieval condition.

6. The machine according to claim 5, wherein said retrieval control means controls said buffer memory means and said sub associative memory means so that the data stored in said buffer memory means is fed back not only to said main associative memory means but also to said sub associative memory means to update the second initial retrieval condition for said sub associative memory means using the data, thereby successively accessing said sub associative memory means.

7. The machine according to claim 6, wherein said sub associative memory means stores the specific knowledge data and data representing objects and values excluding attributes in a one-to-one correspondence manner.

8. The machine according to claim 7, wherein when a plurality of knowledge data are extracted as a result of retrieval in said sub associative memory means, said buffer memory means stores these knowledge data at the same time.

9. The machine according to claim 8, wherein said buffer memory comprises a queuing buffer memory.

10. A method of performing inferential retrieval with respect to a knowledge base, said knowledge base being constituted by a plurality of knowledge data which are arranged to constitute a semantic network and each of which has a set of an object, an attribute, and a value, and being stored in a main associative memory, said method comprising the steps of:

(a) storing a plurality of knowledge data including "is-a" attributes of the plurality of knowledge data in a sub associative memory;

(b) defining, for said main associative memory, a first initial retrieval condition necessary for retrieving, from said knowledge base, knowledge data necessary for answering an input question associated with a given object, in an inferential retrieval mode;

(c) defining, for said sub associative memory, a second initial retrieval condition for retrieving the object included in the question and another object having the "is-a" attribute from the storage content of said sub associative memory;

(d) accessing said sub associative memory using the second initial retrieval condition simultaneously with accessing of said main associative memory using the first initial retrieval condition and reading out data representing another object concept associated with the object concept included in the question by the "is-a" attribute from said sub associative memory;

(e) temporarily storing the data in a buffer memory;

(f) when the retrieval in said main associative memory fails, updating the first initial retrieval condition using the data stored in said buffer memory and forming a secondary first retrieval condition supplied to said main associative memory; and (g) successively accessing said main associative memory using the secondary first retrieval condition.

11. The method according to claim 10, wherein while said main associative memory is successively accessed, the second initial retrieval condition is updated using the data stored in said buffer memory to form a secondary second retrieval condition supplied to said sub associative memory, with which the retrieval in said sub associative memory is performed in a parallel manner.

* * * * *